J. M. CRAWFORD.
Hand-Plow.
No. 57,871. Patented Sept 11, 1866.
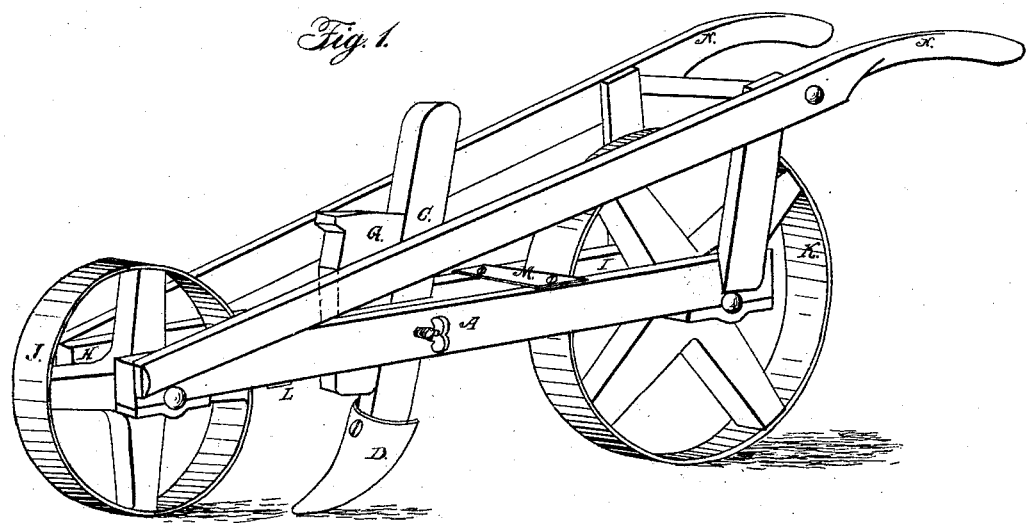
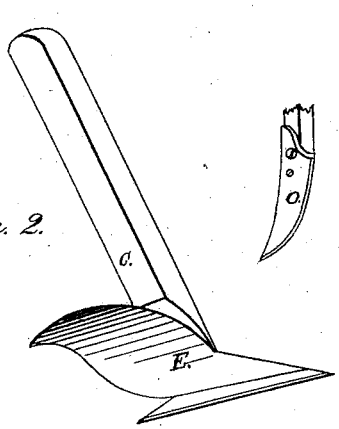
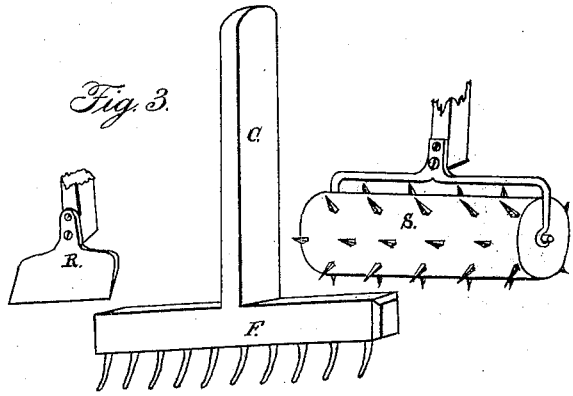
Witnesses:
Frank Underwood
James H. Layman
Inventor:
John M. Crawford.
By Knight Bros
Attorneys

UNITED STATES PATENT OFFICE.

JOHN M. CRAWFORD, OF NEW CASTLE, KENTUCKY.

IMPROVEMENT IN GARDEN-PLOWS.

Specification forming part of Letters Patent No. 57,871, dated September 11, 1866.

*To all whom it may concern:*

Be it known that I, JOHN M. CRAWFORD, of New Castle, Henry county, Kentucky, have invented a new and useful Garden Plow or Cultivator; and I do hereby declare the following to be a full, clear, and exact description of the same, reference being had to the accompanying drawings, making part of this specification.

This invention relates to a peculiarly-arranged implement for the tillage of garden-plots, &c., without the aid of animal power.

A represents a beam, having an inclosed slot, B, for the reception of a sheth, C, which may be that of a shovel-plow, D, or of a turning-plow, E, or of a rake, F, or other instrument. G is a key, which secures the sheth to its position. H I are open slots in the respective ends of the beam to receive wheels J K, unequal in size, which enable the implement to be pushed easily along the ground, and which also serve to preserve any desired uniform penetration of the share or other operative instrument, and consequently depth of tillage, and thus adapt itself to the age and condition of any vegetable.

Scrapers L M, attached to the beam, serve to remove any mud or trash that may cling to the wheels.

N are stilts or handles, by which the implement is both propelled and guided.

I have selected for illustration a form approved by practical test in the garden, but do not propose to confine myself thereto so long as the same results are obtained by means substantially equivalent, as, for example, a set-screw, P, may be used in conjunction with, or in substitution of, the key G, and a transverse or other handle may replace the stilts N.

It is also obvious that the device may be used with a variety of other cultivating instruments—for example, a long narrow fluke or "bull-tongue," Q, adapted for planting and cultivating among vegetables, or a scraper, R, or a spiked and rotary clod-crusher, S.

This is a greater labor-saving instrument, enabling one hand to do more easily and better the work of six with former garden implements, and combines in itself sufficient power and variety to cultivate thoroughly the garden during all seasons.

I claim herein as new and of my invention—

The garden plow or cultivator consisting of the slotted beam A B H I, fore and hind wheels, J and K, fastening G or P, scrapers L M, guiding and propelling handle N, and interchangeble shares or cultivating instruments, substantially as set forth.

In testimony of which invention I hereunto set my hand.

JOHN M. CRAWFORD.

Witnesses:
GEO. H. KNIGHT,
JAMES H. LAYMAN.